No. 694,510. Patented Mar. 4, 1902.
S. F. WISE.
DOUBLE SPINDLE DRAWER PULL BORING MACHINE.
(Application filed May 3, 1901.)
(No Model.) 2 Sheets—Sheet 1.
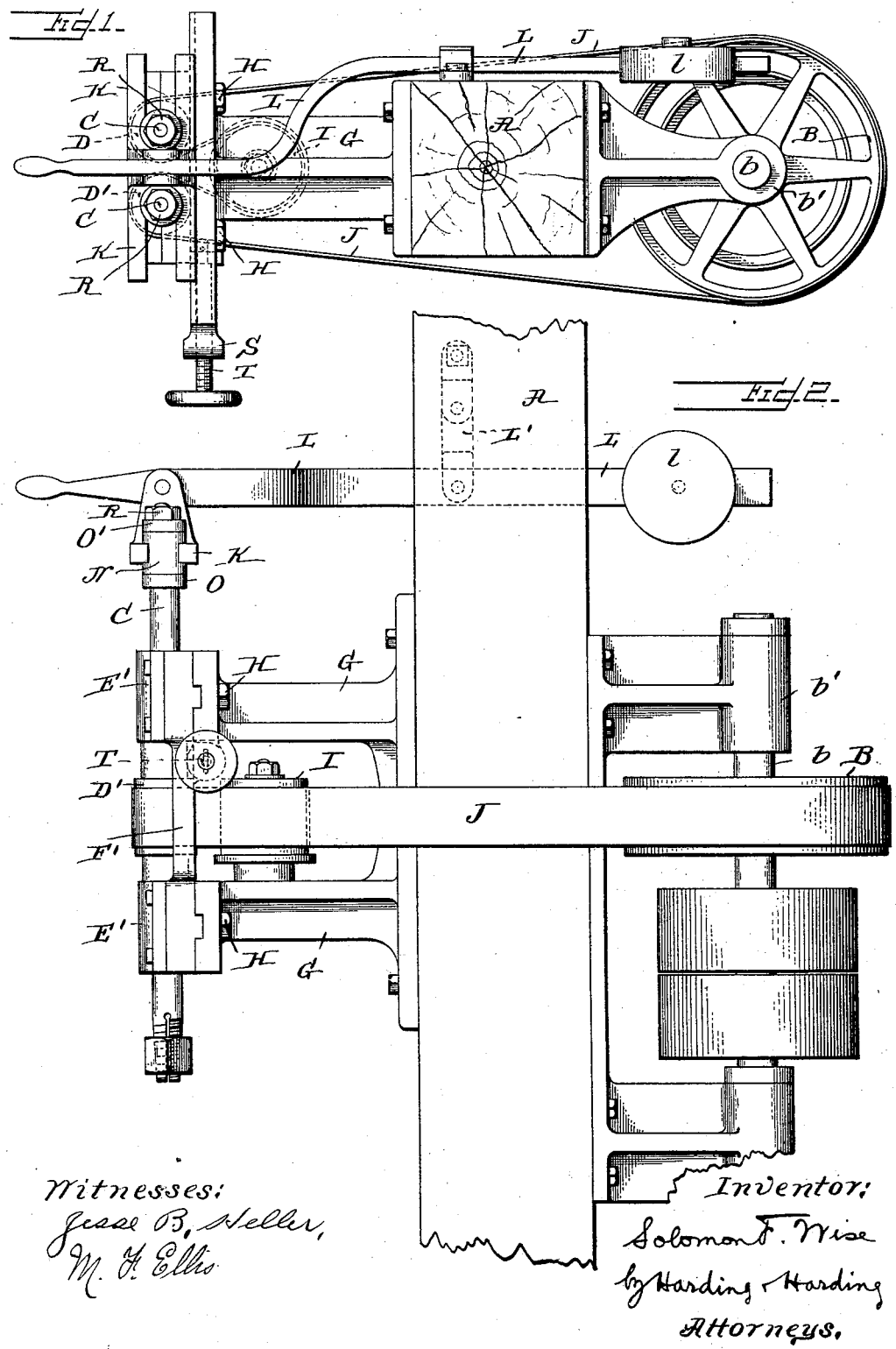
Witnesses:
Jesse B. Heller,
M. H. Ellis
Inventor:
Solomon F. Wise
by Harding & Harding
Attorneys.

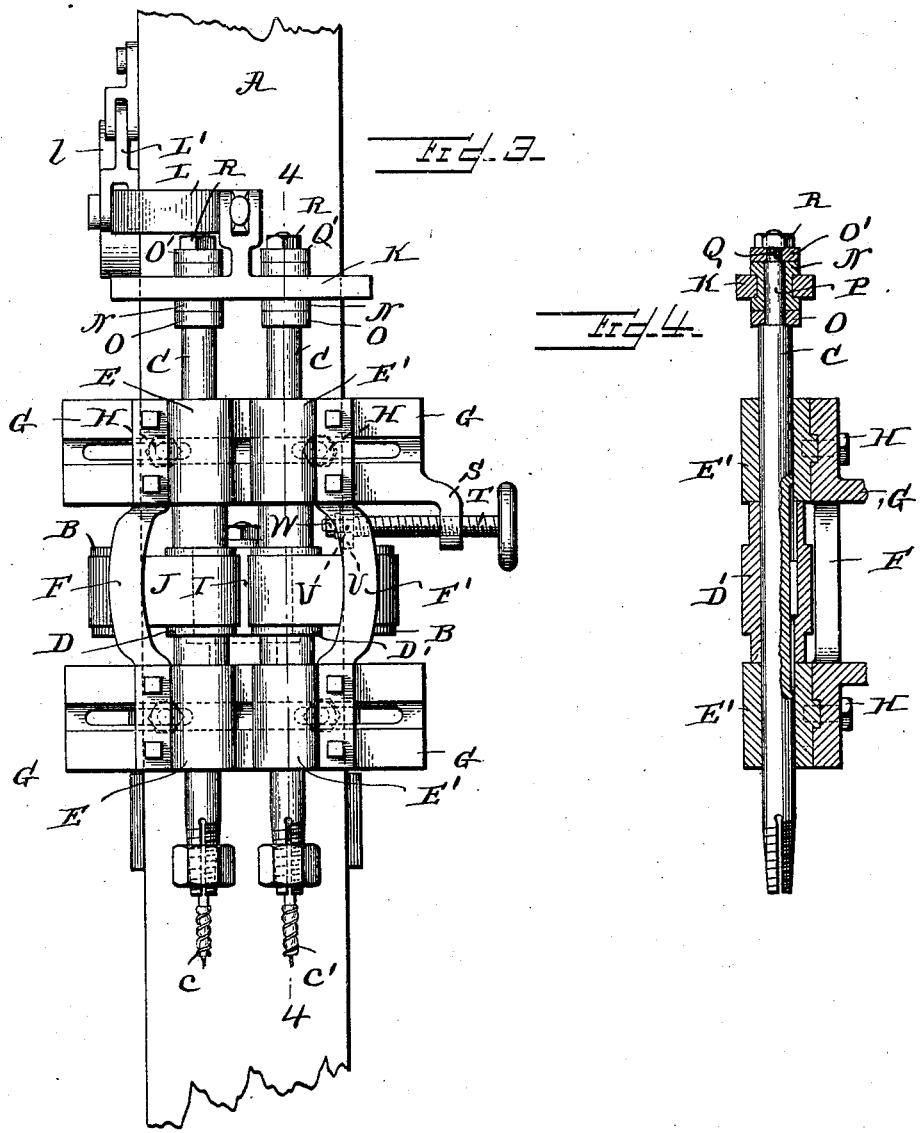

United States Patent Office.

SOLOMON F. WISE, OF PHILADELPHIA, PENNSYLVANIA, ASSIGNOR TO H. B. SMITH MACHINE COMPANY, A CORPORATION OF NEW JERSEY.

DOUBLE-SPINDLE DRAWER-PULL BORING-MACHINE.

SPECIFICATION forming part of Letters Patent No. 694,510, dated March 4, 1902.

Application filed May 3, 1901. Serial No. 58,579. (No model.)

*To all whom it may concern:*

Be it known that I, SOLOMON F. WISE, a citizen of the United States, residing at Philadelphia, county of Philadelphia, and State of Pennsylvania, have invented a new and useful Improvement in Double-Spindle Drawer-Pull Boring-Machines, of which the following is a full, clear, and exact description, reference being had to the accompanying drawings, which form a part of this specification.

My invention relates to a double-spindle drawer-pull boring-machine.

The object of my invention is to improve and simplify the construction of a machine of this character and to adapt it for attachment to an upright post.

It consists of certain details of construction and arrangement hereinafter fully described and claimed.

In the drawings, Figure 1 is a plan view of the machine. Fig. 2 is a side elevation of the same. Fig. 3 is a front view of the same. Fig. 4 is a detail sectional view on the line 4 4 of Fig. 3.

A is an upright post; $b$ an upright driving-shaft rotating in bearings $b'$, secured to one side of the post and provided with the driving-pulley B.

G is a supporting-frame secured to the opposite side of the post.

C C are the spindles of the boring-machine.

$c\ c'$ are the augers, secured to the lower ends of the spindles.

D D' are pulleys splined on the spindles.

E E E' E' are bearings in which the spindles rotate.

F F' are arms integral with and connecting the bearings E E and E' E', respectively, thus forming the spindle-carrying frames E F E and E' F' E'. The supporting-frame G is slotted and bolts H H, &c., extend through the bearings E E E' E' and the slots. The bearings for spindles C are split, as shown in Fig. 2, and tightened by means of bolts Y.

I is a pulley on an upright shaft journaled in bearings in frame G.

J is a driving-belt extending from driving-pulley B to and around pulley D, thence to and around pulley I, thence to and around pulley D', thence back to driving-pulley I.

The bearings for pulley I are adjustable back and forth for tightening the belts.

K is a cross-head.

L is a lever connected between its ends to a link L', pivoted to post A. To one end of the lever a weight $l$ is secured, while the other end is shaped to form a handle. Between its point of pivot and the handle the lever is connected to the cross-head.

The upper part of each spindle C is reduced in cross-section. This reduced portion P is embraced by journal N and washer O, the latter being driven on tight. The reduced portion P is a minute distance above the journal N. The extreme top of the spindle is still further reduced in cross-section, as at Q. The washer O' is slipped over the end of the reduced portion Q and the washer O' held in position by means of the nut R. The central part of journal N is flattened on opposite faces. The cross-head K is provided with slots, the walls of which embrace the journal N and engage the flattened faces thereof.

S is a lug on frame G. This lug has a threaded orifice engaged by the threaded shaft T.

U is a lug on arm F'. This lug is provided with an orifice through which and a minute distance beyond it extends the reduced portion V of the threaded shaft T. The extreme inner end of shaft T is still further reduced and is threaded to receive the nut W.

The operation is as follows: After determining the distance apart to drill the holes the spindles are adjusted laterally, either toward each other or away from each other. To accomplish this adjustment, the nuts R and bolts H H are loosened and the parts E E F are moved by hand laterally. The parts E' E' F' are then moved laterally by turning the threaded shaft T. The required nicety of adjustment is secured by means of the threaded shaft T. It is obvious that by having means for accurate adjustment acting upon one spindle only the spindles can be set with more facility than if such means were provided for both spindles. At the same time the distance between the spindles can be fixed with the same accuracy as if means for accurate adjustment were provided for both spindles. After adjustment the nuts R h h are tightened. The driving-shaft is then rotated, which transmits rotation to the spindles. The work to be bored is placed in position on a table immediately beneath the spindle. During the boring operation the operator depresses the weighted lever until the holes are drilled through. He then releases the same, and the weight lifts the spindles to their original position. The arrangement of the parts P, Q, O, N, O', and R as described permits the spindle to rotate, although the journal N is stationary. Similarly, the threaded shaft T is free to rotate in its bearing in arm F'.

Having now fully described my invention, what I claim, and desire to protect by Letters Patent, is—

1. In a double-spindle boring-machine, in combination, two upright spindles, means for rotating the spindles, laterally-adjustable bearings for the spindles, a slotted cross-head, and a journal loose on the spindle, said journal having flat faces on opposite sides thereof, said flat faces being narrower than the length of the journal and engaging the walls of the slots in the cross-head.

2. In a double-spindle boring-machine, in combination, two upright spindles, means for rotating the spindles, laterally-adjustable bearings for the spindles, said spindles being provided with a reduced portion near its upper end, and a still further reduced portion at its upper end, a journal on the first-named reduced portion, a washer on the first-named reduced portion below the journal, a washer on the end reduced portion, a nut above said washer, the first-named reduced portion extending slightly above the journal and a slotted cross-head, the journal being adapted to slide in the slots of said cross-head.

3. In a double-spindle boring-machine, in combination, a post, an upright driving-shaft on one side thereof, a driving-pulley on said shaft, a slotted supporting-frame on the opposite side of the post, two upright spindles, two bearings for each spindle, pulleys splined on the spindles and confined between the bearings, an idler-pulley rotating in bearings on said frame, bolts extending through said bearings and the slots in the supporting-frame, a slotted cross-head, the upper ends of said spindles extending through said slots, journals loose on the spindles and engaging the slots in the cross-head, a lever pivoted between its ends and secured to the cross-head near one end, a weight at the other end of said lever, and a driving-belt extending successively around the driving-pulley, one of the spindle-pulleys, the idler-pulley, other spindle-pulley, and back to the driving-pulley, substantially as described.

4. In a double-spindle boring-machine, in combination, two upright spindles, two spindle-carrying frames each consisting of two bearings and a connecting-arm, the spindles rotating respectively in the bearings of the two frames, a driving-pulley for each spindle confined between said two bearings and splined to the spindle, a slotted supporting-frame, bolts extending through said bearings and said slots, a threaded shaft engaging the supporting-frame and one of the spindle-carrying frames, means for simultaneously rotating the pulleys, a slotted cross-head, journals loose on the spindles and engaging the slots in the cross-head, and means for depressing the cross-head, substantially as described.

In testimony of which invention I have hereunto set my hand, at Greensboro, on this 30th day of April, 1901.

SOLOMON F. WISE.

Witnesses:
W. D. McADOO,
J. O. COPELAND.